United States Patent [19]
Wittekind et al.

[11] 3,835,142
[45] Sept. 10, 1974

[54] 1-(2-IMIDAZOLIN-2-YL)-2-(1,2,3,4-TETRAHYDRO-2-ISOQUINOLYL)-2-IMIDAZOLINES

[75] Inventors: Raymond R. Wittekind, Morristown; John Shavel, Jr., Mendham, both of N.J.

[73] Assignee: Warner-Lambert Company, Morris Plains, N.J.

[22] Filed: May 15, 1972

[21] Appl. No.: 253,222

Related U.S. Application Data
[63] Continuation-in-part of Ser. No. 6,639, Jan. 28, 1970, Pat. No. 3,666,767.

[52] U.S. Cl. ......... 260/286 R, 260/288 R, 424/258
[51] Int. Cl. ............................................. C07d 35/36
[58] Field of Search ...... 260/288 R, 288 CA, 286 R

[56] References Cited
UNITED STATES PATENTS
| | | | |
|---|---|---|---|
| 3,590,044 | 6/1971 | Hollander | 260/288 |
| 3,666,767 | 5/1972 | Wittekind et al. | 260/296 R |
| 3,691,178 | 9/1972 | Baldwin, et al. | 260/294.9 |

OTHER PUBLICATIONS
Protiva, et al., Chemical Abstract, 52:1147a.
Wittekind et al., Chemical Abstract 78;159520b, of J. Org. Chem. 38(9), 1641-5, (1973).

*Primary Examiner*—Donald G. Daus
*Assistant Examiner*—Ralph D. McCloud
*Attorney, Agent, or Firm*—Albert H. Graddis; Frank S. Chow

[57] ABSTRACT

The present invention relates to 2-amino-1-(2-imidazolin-2-yl)-2-imidazolines, the free base of which has the following structural formulas:

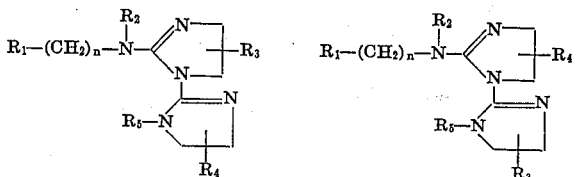

wherein
$R_1$ is hydrogen, lower alkyl, cycloalkyl, aryl, substituted aryl, heterocyclic, substituted heterocyclic or aryloxy;

$R_2$ is hydrogen, lower alkyl, aryl and substituted aryl;

or $R_1$ and $R_2$ taken together with the nitrogen atom to which they are attached form a heterocyclic ring;

$R_3$ and $R_4$ are hydrogen, lower alkyl, aryl, or substituted aryl;

$R_5$ is hydrogen, lower alkyl, aryl or substituted aryl;

$n$ is an integer from 0 to 10.

The compounds of this invention are useful as antiarrhythmic agents as well as antibacterial agents.

2 Claims, No Drawings

1-(2-IMIDAZOLIN-2-YL)-2-(1,2,3,4-TETRAHYDRO-2-ISOQUINOLYL)-2-IMIDAZOLINES

This application is a continuation-in-part of our co-pending application, U.S. Ser. No. 6639, filed Jan. 28, 1970, now U.S. Pat. No. 3,666,767, issued May 30, 1972.

The present invention relates to 2-amino-1-(2-imidazolin-2-yl)-2-imidazolines having the following structural formulas:

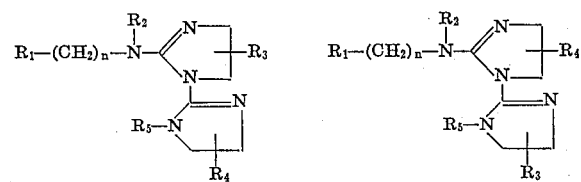

wherein $R_1$ is hydrogen, lower alkyl, cycloalkyl, heterocyclic, substituted heterocyclic, aryl, substituted aryl, or aryloxy;

$R_2$ is hydrogen, lower alkyl, aryl, substituted aryl, or $R_1$ and $R_2$ taken together with the nitrogen atom to which they are attached form a heterocyclic ring, for example, a 5- or 6-membered ring;

$R_3$ and $R_4$ are hydrogen, lower alkyl, aryl or substituted aryl;

$R_5$ is hydrogen, lower alkyl, aryl or substituted aryl;

$n$ is an integer from 0 to 10.

In the definitions for $R_1$, $R_2$, $R_3$, $R_4$, and $R_5$, the term "lower alkyl" includes lower aliphatic hydrocarbons having one to 10 carbon atoms in the carbon chain. It includes straight chain as well as branched chain radicals. The term also includes, for example, methyl, ethyl, propyl, isopropyl, butyl, isobutyl and the like. The term "cycloalkyl" encompasses saturated monocyclic groups having from three to eight carbon atoms, such as cyclopropyl, cyclobutyl, cyclopentyl, cyclohexyl, cycloheptyl, and cyclooctyl. The term "heterocyclic" encompasses the monocyclic five- and six-membered hetero rings having at least one hetero atom in the ring which may be either nitrogen, oxygen or sulfur. Representative heterocyclics falling within this definition are, for example, aziridinyl, azetidinyl, pyrrolyl, pyrrolidinyl, morpholino, thienyl, furyl, pyridyl, piperidyl, indolyl, and the like. Additionally, these five- and six-membered heterocyclics may have further substituents in their ring portions by groups such as, hydrogen, halogen, lower alkyl and lower alkoxy. The term "aryl" denotes a monocyclic or bicyclic hydrocarbon radical, preferably of six to 10 carbon atoms, such as for example, phenyl, naphthyl and the like. The term "substituted aryl" as used herein includes aryl as defined above in which one or more of the hydrogen atoms of the aryl portion have been substituted by groups such as, halogen, hydroxyl, lower alkyl, trifluoromethyl, amino, substituted amino or lower alkoxy. X, in the formulas below, includes anions such as the halides, for example, fluoride, chloride, iodide, bromide, or other anions such as, sulfate, nitrate, phosphate, maleate, fumarate and the like.

The definitions for $R_1$, $R_2$, $R_3$, $R_4$ and $R_5$, and n as used hereinafter have the same meanings as defined above.

The compounds of this invention exhibit antiarrhythmic activity, for example, at a dosage of about 2 to 3 mg/kg, body weight in a mammal such as, cats, dogs, monkeys, and the like. In experimentally induced arrhythmia, such as those induced by ouabain, at a dosage of 2 to 3 mg/kg, the compounds of this invention are capable of arresting such arrhythmia. Generally speaking, the compounds of this invention are useful in conditions associated with cardiac arrhythmia. A dosage level of about 1 to 10 mg, several times daily is recommended. This dosage regimen can be varied according to body weight, sex and species of the mammal being treated.

Among the dosage forms which can be used to administer these compounds are, for example, tablets, powders, elixirs, suspensions and the like. These dosage forms are formulated by procedures known to the pharmacist's art.

All the compounds of this invention also exhibit antibacterial activity against gram positive cocci, such as Staphylococcus aureus or gram negative bacilli, such as E. coli. To use the compounds as anti-bacterials, they are formulated from 1 to 10 percent by weight with a dermatologically acceptable vehicle, such as talc, petrolatum and applied liberally to the site infected with the susceptible bacteria.

The preferred genus of this invention has the following structural formula:

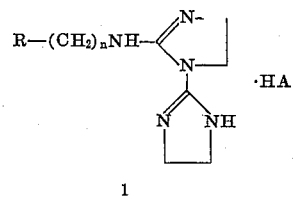

1 where

R = a heterocyclic group such as 1-methyl-2-pyrrolidinyl, 2-oxo-pyrrolidinyl, morpholino, tetrahydrofurfuryl, hexahydroazepin-1-yl, 1,2,3,4-tetrahydro-2-isoquinolyl, pyrrolidinyl, octahydro-1H-azonin-1-yl, 1-indolinyl, 3-quinuclidinyl and the like.

$n = 0 - 3$,

A = an anionic group such as halide, maleate, fumarate and the like.

The imidazolinylimidazolines 1 are prepared by the processes shown below:

A.

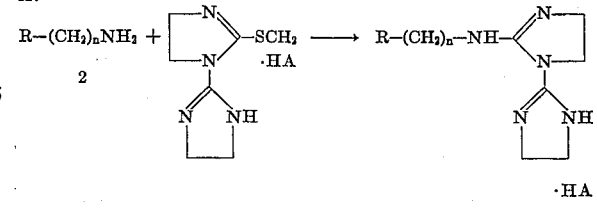

B.

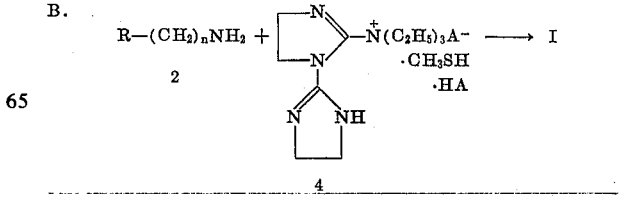

where R, n and A are as defined above.

2-Propanol and acetonitrile are solvents of choice for these processes.

The amines 2 as well as their acid additions salts are available from Aldrich Chemical Company and can be prepared by methods described in Synthetic Organic Chemistry by R. B. Wagner and H. D. Zook, John Wiley and Sons, Inc., New York, N.Y. 1953, p. 653 and p. 832.

1-(2-Imidazolin-2-yl)-2-(methylthio)-2-imidazoline hydroiodide 3 and triethyl[1-(2-imidazolin-2-yl)-2-imidazolin-2-yl]ammonium iodide hydroiodide methanethiol 4 were prepared by the methods depicted on page eight where A has the same meaning as in the preceding paragraph.

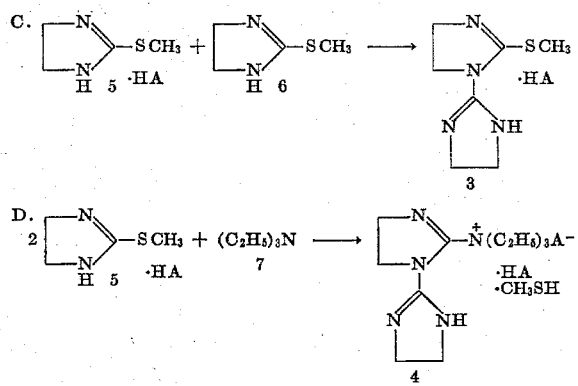

2-Methylmercaptoimidazol-2-ine 6 and its salt 5 are prepared according to procedures given in S. R. Aspinall and E. J. Bianco, J. Org. Chem., 73, 602 (1951), W. Wilson, J. Chem. Soc., 1389 (1955) and A. L. Langis and F. Herr, Can. 736, 494 (June 14, 1966), C. A., 65, 12212 (1966).

2-Propanol and acetonitrile are useful solvents for these processes.

To further illustrate the practice of this invention, the following examples are included:

EXAMPLE 1

2-{[3-(Hexahydroazepin-1-yl)propyl]amino}-1-(2-imidazolin-2-yl)-2-imidazoline Dihydroiodide. — A solution of 3-(hexahydroazepin-1-yl)propylamine (12.5 g. 0.0800 mole), 1-(2-imidazolin-2-yl)2-(methylthio)-2-imidazoline hydroiodide (25.0 g. 0.0800 mole), 50 percent hydroiodic acid (20.2 g) and 2-propanol (200 ml) was heated under reflux for 24 hours while a steady stream of nitrogen was bubbled through the solution. The reaction mixture was allowed to cool to room temperature. The solid was collected and recrystallized from 2-propanol-water; yield 12.9 g (30.0 percent), mp 217°–219°.

Anal. Calcd for $C_{15}H_{30}I_2N_6$: C, 32.86; H, 5.52; I, 46.29; N, 15.33. Found: C, 33.03; H, 5.49; I, 46.09; N, 15.04.

EXAMPLE 2

1-(2-Imidazolin-2-yl)-2-(1-indolinyl)-2-imidazoline. — A solution of indoline (11.9 g. 0.100 mole), 1-(2-imidazolin-2-yl)-2-(methylthio)-2-imidazoline hydroiodide (31.2 g, 0.100 mole) and acetonitrile (600 ml) was heated under reflux for 19 hours while a steady stream of nitrogen was passed through the reaction mixture. The reaction mixture was evaporated under reduced pressure. The residue was partitioned between 2N sodium hydroxide solution and methylene chloride. The aqueous phase was extracted with methylene chloride. The combined organic phase was dried over anhydrous sodium sulfate, filtered and the filtrate was concentrated under reduced pressure. Trituration of the residue with ether followed by recrystallization from benzene, methylene chloride-cyclohexane and acetone gave 11.2 g (44.0 percent) of the imidazoline, mp. 162.0°–166.0°.

Anal. Calcd for $C_{14}H_{17}N_5$: C, 65.86; H, 6.71; N, 27.43. Found: C, 66.05; H, 6.98; N, 27.51.

EXAMPLE 3

1-(2-Imidazolin-2-yl)-2-(1,2,3,4-tetrahydro-2-isoquinolyl)-2-imidazoline Hydroiodide. — A solution of 1,2,3,4-tetrahydroisoquinoline (6.65 g, 0.0500 mole), 1-(2-imidazolin-2-yl)-2-(methylthio)-2-imidazoline hydroiodide 15.6 g (0.0500 mole) and acetonitrile (250 ml) was heated under reflux for 22 hours while a steady stream of nitrogen was passed through the reaction mixture. The solution was evaporated. Trituration of the residue with acetone followed by two recrystallizations from acetone gave 7.50 g (37.6 percent) of the imidazoline, mp 202.0°–204.0°.

Anal. Calcd for $C_{15}H_{20}IN_5$: C, 45.35; H, 5.07; I, 31.94; N, 17.63. Found: C, 45.28; H, 4.80; I, 31.95; N, 17.69.

EXAMPLE 4

1-(2-imidazolin-2-yl)-2-(octahydro-1H-azonin-1-yl)-2-imidazoline Hydroiodide. — A solution of octamethyleneimine (5.10 g, 0.040 mole), 1-(2-imidazol-2-yl)-2-(methylthio)-imidazoline hydroiodide (12.5 g, 0.040 mole) and acetonitrile (65 ml) was heated under reflux for 89 hours while a steady stream of nitrogen was passed through the reaction mixture. The reaction mixture was evaporated. Trituration of the residue with acetone followed by recrystallization from 2-propanol gave 2.5 g (16 percent) of the imidazoline hydroiodide, mp 120.0°–122.0°C.

Anal. Calcd for $C_{14}H_{26}IN_5$: C, 42.97; H, 6.70; I, 32.43; N, 17.90. Found: C, 42.83; H, 6.96; I, 32.47; N, 17.69.

EXAMPLE 5

4-[1-(2-Imidazolin-2-yl)-2-imidazolin-2-yl]morpholine Hydroiodide. A solution of morpholine (7.32 g. 0.0800 mole), triethyl [1-(2-imidazolin-2-yl)-2-imidazolin-2-yl]ammonium iodide hydroidide methanethiol (43.3 g, 0.0840 mole) and distilled (from calcium hydride) 2-propanol (300 ml) was heated under reflux for 5 hours while a steady stream of nitrogen was passed through the reaction mixture. The precipitate was collected and recrystallized from 2-propanol; yield 3.48 g (15 percent) of the imidazoline hydroiodide, mp 201.0°–202.0° dec.

Anal. Calcd for $C_{10}H_{18}IN_5O$: C, 34.20; H, 5.17; I, 36.14; N, 19.94; O, 4.56. Found: C, 34.08; H, 5.26; I, 36.34; N, 19.73; O, 4.75.

EXAMPLE 6

1-(2-Imidazolin-2-yl)-2-(1-pyrrolidinyl)-2-imidazoline Dimaleate. — A solution of pyrrolidine (7.20 g, 0.100 mole), 1-(2-imidazolin-2-yl)-2-(methylthio)-2-imidazoline hydroiodide (31.2 g, 0.100 mole) and acetonitrile (80 ml) was heated under reflux for 6 hours while a steady stream of nitrogen was passed through the reaction mixture. The reaction mixture was evaporated under reduced pressure. The residue was dissolved in water (150 ml), 20 percent sodium hydroxide solution (50 ml) was added and the solution was extracted with methylene chloride. The combined organic phase was dried over anhydrous sodium sulfate, filtered and concentrated under reduced pressure. The residual oil was dissolved in 2-propanol (100 ml) and maleic acid (9.78 g) was added. The solution was evaporated and the residue was triturated with acetone. The precipitate was collected and recrystallized from 2-propanol (4 times); yield 4.80 g (15.0 percent) of the imidazolin dimaleate, mp. 150.0°–151.0° dec.

Anal. Calcd for $C_{18}H_{25}N_5O_8$: C, 49.20; H, 5.73; N, 15.94; O, 29.13. Found: C, 49.43; H, 5.91; N, 16.07; O, 29.15.

EXAMPLE 7

1-(2-Imidazolin-2-yl)-2-[(tetrahydrofurfuryl)amino]-2-imidazoline Hydroiodide. — A solution of tetrahydrofurfurylamine (6.06 g, 0.06 mole), 1(2-imidazolin-2-yl)-2-(methylthio)-2-imidazoline hydroiodide (18.7 g, 0.06 mole) and 2-propanol (200 ml) was heated under reflux for ½ hour while a stream of nitrogen was passed through the reaction mixture. The solution was allowed to cool to room temperature. The solid was collected and recrystallized from 2-propanol; yield 10 g (46 percent) of the imidazoline, mp. 200°–203°.

Anal. Calcd. for $C_{11}H_{20}IN_5O$: C, 36.18; H, 5.52; I, 34.75; N, 19.18; O, 4.38. Found: C, 36.33; H, 5.47; I, 34.58; N, 19.27; O, 4.37.

EXAMPLE 8

1-(2-Imidazolin-2-yl)-2-{[2-(1-methyl-2-pyrrolidinyl)ethyl]amino}-2-imidazoline Dihydroiodide. — A solution of 2-(2-aminoethyl)-1-methylpyrrolidine (9.00 g, 0.0700 mole), 1-(2-imidazolin-2-yl)-2-(methylthio)-2-imidazoline hydroiodide (21.8 g, 0.0700 mole), 50 percent hydriodic acid (18.0 g, 0.0700 mole) and 2-propanol (250 ml) was heated under reflux for 5 hours while a steady stream of nitrogen was passed through the solution. The reaction mixture was allowed to cool to room temperature. The precipitate was collected and recrystallized from methanol containing a few drops of 50 percent hydriodic acid; yield 12.1 g (33 percent) of the imidazoline dihydroiodide, m.p. 200°–202°.

Anal. Calcd. for $C_{13}H_{26}I_2N_6$: C, 30.02; H, 5.04; I, 48.79; N, 16.16. Found: C, 29.73; H, 4.96; I, 48.74; N, 16.09.

EXAMPLE 9

1-(2-Imidazolin-2-yl)-2-[(2-morpholinoethyl)amino]-2-imidazoline hydroiodide. — A solution of N-aminoethylmorpholine (15.6 g., 0.120 moles), 1-(2-imidazolin-2-yl)-2-(methylthio)-2-imidazoline hydroiodide (37.5 g., 0.120 mole) and 2-propanol (600 ml) was heated under reflux for 2 hours while a steady stream of nitrogen was passed through the reaction medium. The solution was allowed to cool to room temperature. The precipitate was collected and recrystallized from 2-propanol; yield 16.8 g. (34 percent) of the imidazoline, m.p. 163°–165°.

Anal. Calcd. for $C_{12}H_{23}IN_6O$: C, 36.56; H, 5.88; I, 32.19; N, 21.32; O, 4.06. Found: C, 36.83; H, 5.87; I, 32.08; N, 21.49; O, 4.11.

EXAMPLE 10

1-(3-{[1-(2-Imidazolin-2-yl)-2-imidazolin-2-yl]amino propyl)-2-pyrrolidinone hydroiodide. — A solution of N-(3-aminopropyl)-2-pyrrolidinone (7.10 g., 0.0500 moles), 1-(2-imidazolin-2-yl)-2-(methylthio)-2-imidazoline hydroiodide (15.6 g., 0.05 moles) and 2-propanol (250 ml.) was heated under reflux for 1 hour while a steady stream of nitrogen was passed through the reaction medium. The reaction mixture was allowed to cool to room temperature. The solid was collected and recrystallized from 2-propanol; yield 7.52 g. (37.0 percent) of the imidazoline, m.p. 184°–185°.

Anal. Calcd for $C_{13}H_{23}IN_6O$: C, 38.43; H, 5.71; I, 31.24; N, 20.69. Found: C, 38.18; H, 5.63; I, 31.35; N, 20.43.

EXAMPLE 11

1-(2-Imidazolin-2-yl)-2-(3-quinuclidinylamino)-2-imidazoline Dihydrochloride Monohydrate. — A solution of 3-aminoquinuclidine dihydrochloride (25.4 g, 0.128 mole), 2-methylmercaptoimidazol-2-ine (29.6 g, 0.255 mole) and distilled (from calcium hydride) 2-propanol (200 ml) was heated under reflux for 5 hours while a slow stream of nitrogen was bubbled through the reaction mixture. The reaction mixture was then concentrated to about half of its original volume and cooled to room temperature. 2-Propanol (100 ml) was added. The precipitate was collected and recrystallized from 94 percent 2-propanol-water; yield 7.20 g (17.0 percent) of the imidazoline dihydrochloride monohydrate, mp. 279.0°–281.0° dec.

Anal. Calcd for $C_{13}H_{26}Cl_2N_6O$: C, 44.20; H, 7.42; N, 23.79; O, 4.53; Cl, 20.07. Found: C, 44.50; H, 7.46; N, 23.92; O, 4.48; Cl, 19.87.

We claim:
1. A compound of the formula:

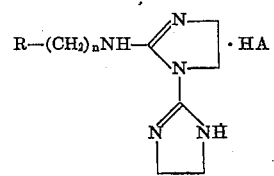

wherein R is 1,2,3,4-tetrahydro-2-isoquinolyl; n is a member selected from the group consisting of 1, 2 and 3 and HA is a member selected from the group consisting of pharmaceutically acceptable acids.

2. A compound which is 1-(2-Imidazolin-2-yl)-2-(1,2,3,4-tetrahydro-2-isoquinolyl)-2-imidazoline Hydroiodide.

* * * * *